US009760627B1

(12) United States Patent
Bradley et al.

(10) Patent No.: US 9,760,627 B1
(45) Date of Patent: Sep. 12, 2017

(54) PRIVATE-PUBLIC CONTEXT ANALYSIS FOR NATURAL LANGUAGE CONTENT DISAMBIGUATION

(71) Applicant: International Business Machines Corporation, Armonk, NY (US)

(72) Inventors: Lisa M. W. Bradley, Cary, NC (US); Liam Harpur, Skerries (IE); Aaron J. Quirk, Cary, NC (US); Lin Sun, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/154,162

(22) Filed: May 13, 2016

(51) Int. Cl.
   G06F 17/27 (2006.01)
   G06F 17/30 (2006.01)
   G10L 15/10 (2006.01)

(52) U.S. Cl.
   CPC .... *G06F 17/30684* (2013.01); *G06F 17/2705* (2013.01); *G06F 17/2785* (2013.01); *G06F 17/30699* (2013.01); *G10L 15/10* (2013.01)

(58) Field of Classification Search
   CPC ... G06F 17/27; G06F 17/2705; G06F 17/2785
   See application file for complete search history.

(56) References Cited

U.S. PATENT DOCUMENTS 7,444,351 B1 * 10/2008 Nomiyama ........... G06F 17/278
8,868,404 B1 * 10/2014 Yancey .................. G06F 17/28
704/7
9,553,842 B1 * 1/2017 Fisher ................. H04M 3/5191
(Continued)

FOREIGN PATENT DOCUMENTS

WO    WO2015/058604 A1    4/2015

OTHER PUBLICATIONS

"Latent semantic indexing", Wikipedia, https://en.wikipedia.org/wiki/Latent_semantic_indexing, last modified on Feb. 11, 2016, accessed on May 12, 2016, 10 pages.
(Continued)

*Primary Examiner* — Eric Yen
(74) *Attorney, Agent, or Firm* — Stephen J. Walder, Jr.; Richard A. Wilhelm

(57) ABSTRACT

Mechanisms are provided for implementing a natural language content (NLC) disambiguation engine. The NLC disambiguation engine operates to identify, in a corpus of natural language content, a portion of natural language content (NLC) that is determined to be ambiguous with regard to the context of the portion of NLC. The NLC disambiguation engine compares the ambiguous content portion to private content information associated with a source of the ambiguous content portion. The NLC disambiguation engine identifies a domain of the ambiguous content portion based on a domain of a matching portion of the private content information. The NLC disambiguation engine performs a clarifying operation that clarifies the ambiguous content portion based on the identified domain of the matching portion of the private content information to thereby generate a clarified content portion for processing by a cognitive operation of a cognitive system.

21 Claims, 6 Drawing Sheets

(56) References Cited

U.S. PATENT DOCUMENTS

| | | | |
|---|---|---|---|
| 2002/0118379 A1* | 8/2002 | Chakraborty | G06F 17/2241 358/1.9 |
| 2004/0102957 A1* | 5/2004 | Levin | G06F 17/2735 704/3 |
| 2004/0261021 A1* | 12/2004 | Mittal | G06F 3/0237 715/256 |
| 2005/0017954 A1* | 1/2005 | Kay | G06F 3/0233 345/169 |
| 2005/0038770 A1* | 2/2005 | Kuchinsky | G06F 17/2775 |
| 2005/0080613 A1* | 4/2005 | Colledge | G06F 17/2785 704/9 |
| 2005/0289141 A1* | 12/2005 | Baluja | G06F 17/2735 |
| 2006/0206303 A1* | 9/2006 | Kohlmeier | G06F 9/4448 704/2 |
| 2006/0206472 A1 | 9/2006 | Masuichi et al. | |
| 2006/0230350 A1* | 10/2006 | Baluja | G06F 3/0237 715/700 |
| 2007/0136273 A1* | 6/2007 | Rehberg | G06F 17/248 |
| 2009/0112572 A1* | 4/2009 | Thorn | G06F 3/038 704/3 |
| 2009/0287678 A1 | 11/2009 | Brown et al. | |
| 2010/0262621 A1* | 10/2010 | Ross | G06F 17/2836 707/780 |
| 2010/0287210 A1* | 11/2010 | Olof-Ors | G06F 17/278 707/803 |
| 2010/0299134 A1* | 11/2010 | Lam | A61H 3/061 704/3 |
| 2011/0066587 A1 | 3/2011 | Ferrucci et al. | |
| 2011/0082687 A1* | 4/2011 | Pham | G06F 17/273 704/9 |
| 2011/0125734 A1 | 5/2011 | Duboue et al. | |
| 2012/0179642 A1* | 7/2012 | Sweeney | G06F 17/2785 706/55 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0288219 A1 | 10/2013 | Dheap et al. | |
| 2014/0108004 A1* | 4/2014 | Sternby | G06F 17/242 704/9 |
| 2015/0039295 A1* | 2/2015 | Soschen | G06F 17/2705 704/9 |
| 2015/0039536 A1 | 2/2015 | Cook et al. | |
| 2015/0058329 A1 | 2/2015 | Cook et al. | |
| 2015/0310112 A1 | 10/2015 | Allen et al. | |
| 2016/0371249 A1* | 12/2016 | Chilakamarri | G06F 17/2705 |

OTHER PUBLICATIONS

Anonymous, "%RBS% Method and Apparatus for User Authentication Based on Dynamic Question-Answer Generation from Social Networks Data", IP.com, IP.com No. IPCOM000216026D, Mar. 19, 2012, 4 pages.

Anonymous, "Questionnaire-based process of action authentication in social network", IP.com, IP.com No. IPCOM000211589D, Oct. 13, 2011, 4 pages.

Anonymous, "Social Based Action Completion", IP.com, IP.com No. IPCOM000238707D, Sep. 12, 2014, 11 pages.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May-Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

PRIVATE-PUBLIC CONTEXT ANALYSIS FOR NATURAL LANGUAGE CONTENT DISAMBIGUATION

BACKGROUND

The present application relates generally to an improved data processing apparatus and method and more specifically to mechanisms for disambiguating natural language content based on private-public context analysis.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating cognitive systems, such as cognitive search engines, Question and Answer (QA) systems, and the like, which may take an input a search request or question, analyze it, and return results indicative of the most probable matches to the search request or answer to the input question. These cognitive systems provide automated mechanisms for searching through large sets of sources of content, e.g., electronic documents, and analyze them in a manner that simulates human thought in order to generate a reasoned output.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is performed, in a data processing system comprising a processor and a memory, the memory comprising instructions which are executed by the processor to configure the data processing system to implement a natural language content (NLC) disambiguation engine. The method comprises identifying, by the NLC disambiguation engine, in a corpus of natural language content, a portion of natural language content (NLC) that is determined to be ambiguous with regard to the context of the portion of NLC, thereby identifying an ambiguous content portion. The method further comprises comparing, by the NLC disambiguation engine, the ambiguous content portion to private content information associated with a source of the ambiguous content portion. The private content information is content information accessible to users and resources associated with the source and is not accessible to users or resources that are not associated with the source. The method also comprises identifying, by the NLC disambiguation engine, a domain of the ambiguous content portion based on a domain of a matching portion of the private content information. In addition, the method comprises performing, by the NLC disambiguation engine, a clarifying operation that clarifies the ambiguous content portion based on the identified domain of the matching portion of the private content information to thereby generate a clarified content portion for processing by a cognitive operation of a cognitive system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
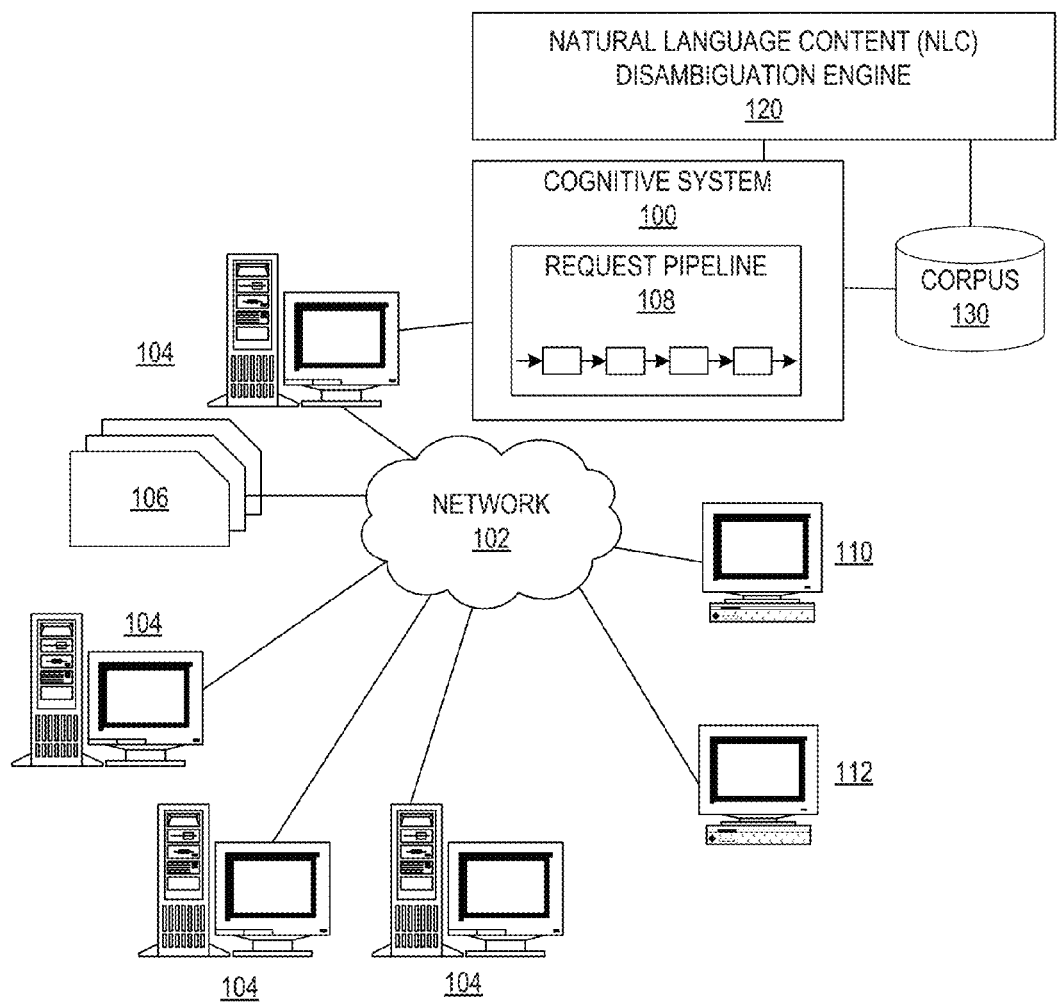
FIG. 1 depicts a schematic diagram of one illustrative embodiment of a cognitive system in a computer network.

The illustrative embodiments provide mechanisms for disambiguating natural language content based on analysis of private-public contexts. That is, many times the subject matter or domain of natural language content may not be readily discernable if the private context of the source of the natural language content is not known publically. For example, a user of a messaging service, social networking website, or other communication or collaborative system that facilitates the storage, accessing, and/or distribution of natural language content, may post a statement of the type "the new 9.0.3 release is really good to use." Without knowing the private context of this statement, it is not clear what the statement is referring to and thus, what the subject matter or domain of the statement may be. This may leave a reader of the statement to make a variety of errors and assumptions when attempting to utilize this statement or respond to this statement. For example, a person may guess the subject matter of the statement incorrectly, may submit subsequent posts that are unexpected or do not correlate with the intended subject matter of the ambiguous statement, the author of the statement may be viewed as unprofessional or as an attention seeker, and readers of the statement may be annoyed and not take the author of the statement seriously.

Such vague or ambiguous statements may also hinder collaboration and, in some cases, may even cause users to stop using collaboration platforms that would otherwise assist them in obtaining valuable information.

Often times the information that is required to fully clarify what the author of a portion of natural language content, e.g., a statement, is referring to is private to the author or a group associated with the author and thus, an outside reader often does not have access to this information unless they are given private access by the author or are part of the group. Additionally, legal requirements may cause difficulties in sharing private information broadly such that it is difficult for a reader to research the author's private information context for the vague or ambiguous natural language content. Private information in the context of the present description refers to content associated with a source that is accessible by the source and other users and resources associated with that source which the source has permitted access, but is not accessible to users and resources that are not associated with the source or which have not been given permission by the source to access the private information.

The illustrative embodiments address the above issue by providing mechanisms that generate a linkage between private information of the author of a vague or ambiguous portion of natural language content, and public information generally available to the outside reader of the portion of natural language content, such that subject matter or domain context of the portion of natural language content may be accurately identified without violating the privacy of the author's private information. The mechanisms of the illustrative embodiments operate to analyze the private information to determine a subject matter or domain context of the vague or ambiguous statement and then utilize this subject matter or domain context to evaluate publically available information to determine clarifying information for clarifying the original vague or ambiguous portion of natural language content. This clarifying information is obtained from the publically available information (i.e. information that is available to users and resources associated with the source of the ambiguous portion of natural language content and users/resources that are not associated with the source of the ambiguous portion of natural language content or that have not been given access to the private information) that is available to the reader based on the identified subject matter or domain determined from the private information associated with the author of the original vague or ambiguous portion of natural language content. It should be appreciated that the author may specify which subject matter or domain information within the private information may be made available for use in clarifying portions of natural language content, e.g., which subject matter context items, domains, and the like, in a taxonomy may be matched by a clarifying search of the taxonomy, thereby maintaining the privacy of the author.

The mechanisms of the illustrative embodiments may be implemented in any system that operates on natural language content which may be provided by any suitable source of natural language content for the particular implementation. In some illustrative embodiments, the mechanisms are implemented in systems for disambiguating natural language content provided via one or more source systems of a cloud computing system. For example, various websites hosted on various server computing systems may have natural language content that may include ambiguous or vague statements upon which the mechanisms of the illustrative embodiments may operate. For example, the mechanisms may continuously or periodically operate on natural language content of the websites to identify vague or ambiguous natural language content that is present and then perform the operations described herein to disambiguate the vague or ambiguous natural language content. For example, the website may be a collaborative website through which users exchange natural language messages and the mechanisms of the illustrative embodiments may continuously or periodically analyze these messages to determine if they are vague or ambiguous and identify ways in which these messages may be disambiguated.

In other illustrative embodiments, the mechanisms may be implemented with other types of cognitive systems to assist with cognitive searches of large aggregations of natural language content, assist with cognitive question answering, or any other cognitive operation performed by an automated or semi-automated computing system. In some illustrative embodiments, these cognitive operations are question answering operations that utilize a cognitive system implementing a question answering system, such as the IBM Watson™ cognitive system, to answer input questions using analysis of one or more corpora of natural language content. In such cases, the mechanisms of the illustrative embodiments may be utilized, for example, when ingesting a corpus of natural language content upon which the cognitive system operates such that any vague or ambiguous natural language content is disambiguated prior to the cognitive system performing its cognitive operations on the natural language content.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
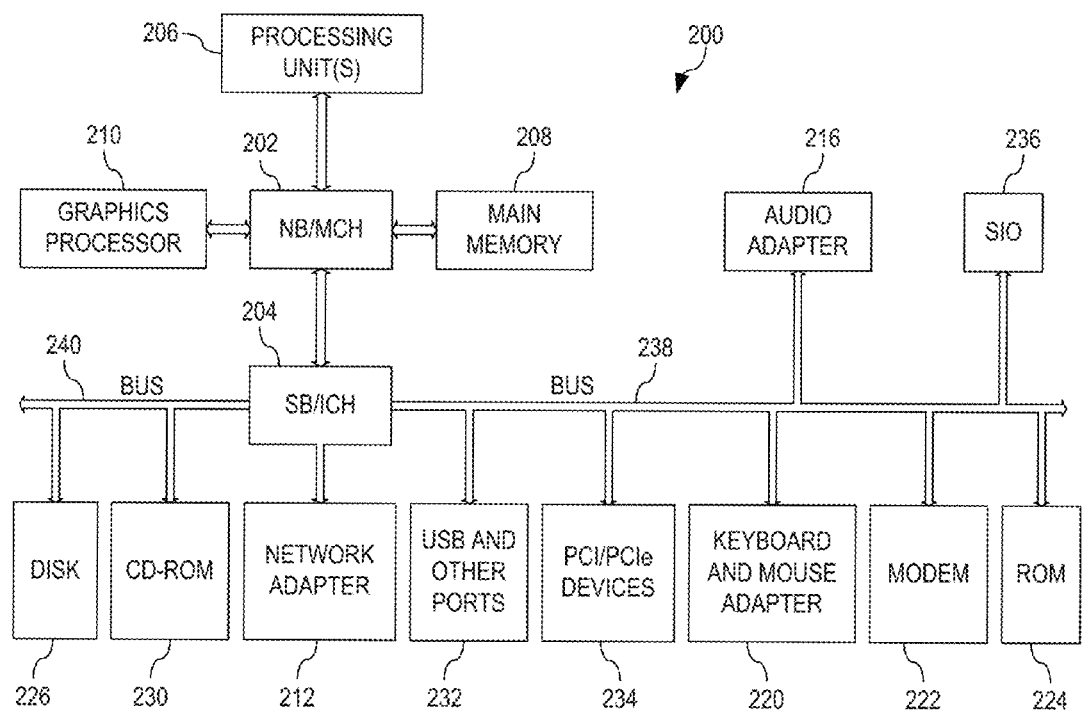
FIG. 2 is a block diagram of an example data processing system in which aspects of the illustrative embodiments are implemented.
Figure 3:
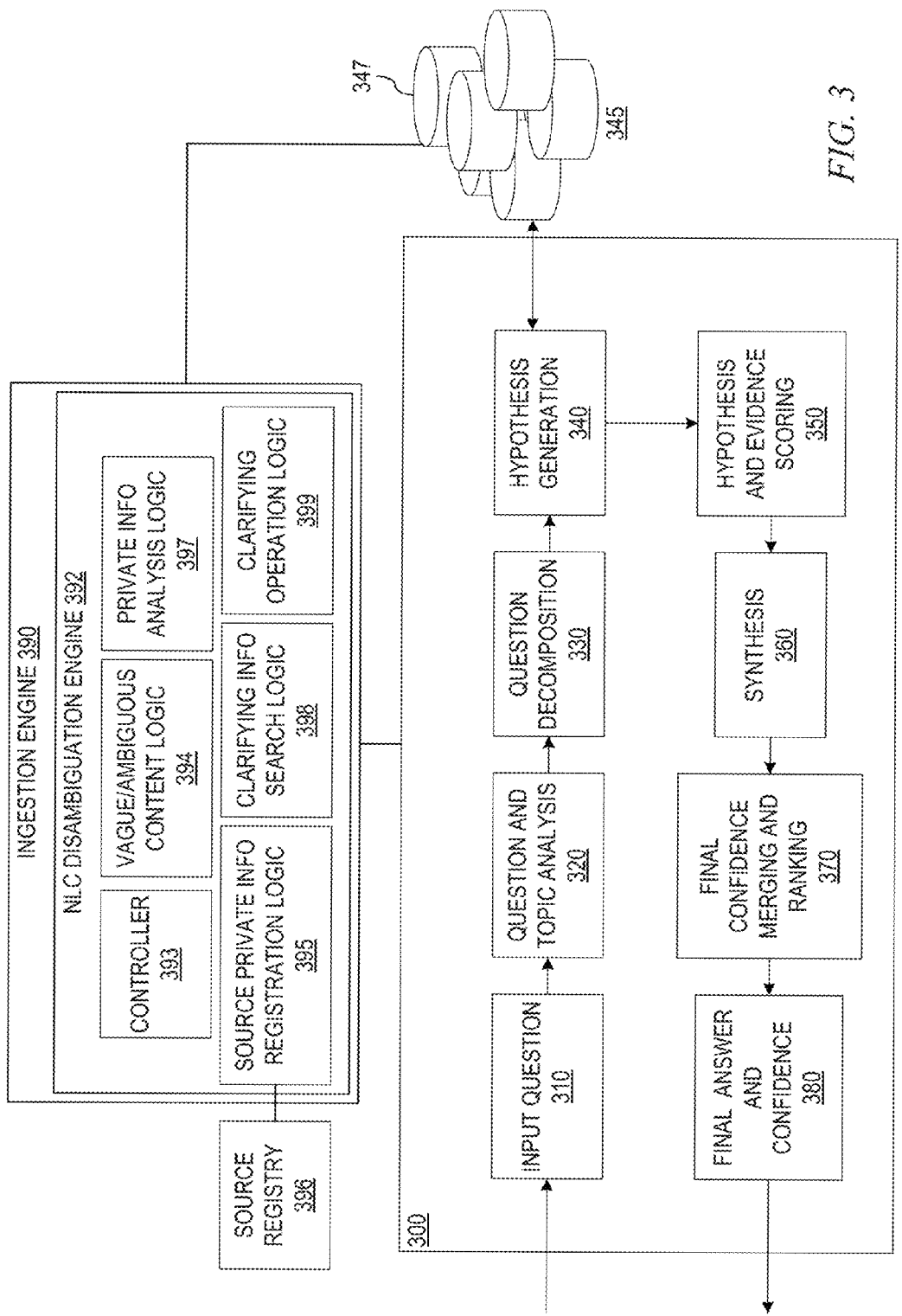
FIG. 3 is an example block diagram of an example question answering pipeline in which aspects of the illustrative embodiments may be implemented.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-2 are directed to describing an example cognitive system, methodology, and computer program product with which the mechanisms of the illustrative embodiments are implemented. As will be discussed in greater detail hereafter, the illustrative embodiments are integrated in, augment, and extend the functionality of the cognitive system with regard to disambiguating portions of natural language content upon which the cognitive system operates by determining a subject matter or domain of the portion of natural language content based on private information of the author and a determination of clarifying information in publically available content based on the private information determined subject matter or domain (hereafter simply referred to as the "domain" of the natural language content).

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a request processing pipeline 108 in a computer network 102. The request processing pipeline 108 may process a search request, input question, or the like, using cognitive mechanisms which include natural language processing mechanisms. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, sub-systems, and/or devices other than those that are depicted herein.

The cognitive system 100 is configured to implement a request pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input requests/questions to the cognitive system 100 that are answered by the content in the corpus of data 106. In one embodiment, the requests/questions are formed using natural language. The cognitive system 100 parses and interprets the request/question via a request pipeline 108, and provides a response to the cognitive system user, e.g., cognitive system user 110, containing one or more search results/answers to the question. In some embodiments, the cognitive system 100 provides a response to users in a ranked list of candidate search results/answers while in other illustrative embodiments, the cognitive system 100 provides a single final search result/answer or a combination of a final search result/answer and ranked listing of other candidate search results/answers.

The cognitive system 100 implements the request pipeline 108 which comprises a plurality of stages for processing an input request, such as a search request, input question, or the like, and the corpus of data 106. The request pipeline 108 generates search results, answers for the input question, or the like, based on the processing of the input request/question and the corpus of data 106. An implementation of the request pipeline 108 as a question answering (QA) pipeline will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined herein, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

It should be appreciated that while some of the illustrative embodiments will be described as being implemented in a cognitive system that utilizes a QA pipeline, the illustrative embodiments are not limited to such. Rather, the mechanisms of the illustrative embodiments may be utilized in any cognitive system that operates upon natural language content so as to perform operations for disambiguating portions of natural language content for further processing. This further processing may be to provide search results in response to a search request, provide answers to input questions, or perform any other operation based on the processing of natural language content. The use of a cognitive system implementing a QA pipeline when describing an example implementation of the illustrative embodiments is for illustrative purposes only and is not intended to state or imply any limitation as to the other possible implementations of the mechanisms of the illustrative embodiments in other cognitive systems.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a natural language content (NLC) disambiguation engine 120. The natural language content disambiguation engine operates automatically, semi-automatically such as in response to a request, as part of a corpus ingestion operation, or in response to any other identification of an ambiguous or vague portion of natural language content, such as may be present in corpus 130 for example, to disambiguate the portion of natural language content based on an identification of the domain of the portion of natural language content using private information of the author of the portion of natural language content that the author has pre-approved for use in performing such disambiguation operations. Thereafter, the disambiguation engine uses the determined domain of the portion of natural language content to search a public corpus of information to identify clarifying information which may be used to clarify the original portion of natural language content. This clarifying information may be used to submit a clarifying question to the author or source of the original portion of natural language content, provide suggestions as to how to clarify the original portion of natural language content, provide additional context and natural language content upon which to operate, modify the original portion of natural language content to generate modified natural language content that disambiguates the original portion of natural language content, or any other clarifying operation.

The NLC disambiguation engine 120 receives as input a corpus of natural language content which may comprise any amount of natural language content from a single statement, passage, document, collection of documents, or the like. The NLC disambiguation engine 120 analyzes the corpus of natural language content and identifies a portion of the natural language content as being vague or ambiguous, e.g., the NLC disambiguation engine 120 may receive a log of posts that users have made to a social networking website, collaboration website, or the like, and may identify a particular post of a natural language statement to be vague or ambiguous. The identification of the vague or ambiguous portion of natural language content (hereafter considered to be a "statement" for purposes of ease of explanation but not limited to such) may be performed in a manual manner by a user, system administrator, or other authored person, or automatically by an automated tool. For example, in the same way that a user may click a "like" or "unlike" option for a user's post to a website, the user may be provided with a user interface component that allows the user to identify that the user is "unsure" about the post, i.e. that the post is vague or ambiguous and the user is unsure whether to like or not like the post.

Automatic assertion that the post is vague or ambiguous can also be achieved by comparing the statement to known patterns of natural language that are predetermined to be vague or ambiguous. For example, patterns of natural language may be predetermined for statements such as "eating babies can be messy", "she stood drinking in the mountains", "elections are won by threatening people", and the like. Mechanisms exist for identifying vague or ambiguous language and thus, a more detailed discussion of these automated tools is not provided herein. For ease of explanation of the mechanisms of the illustrative embodiments, it will be assumed that a user has marked a post of a statement on the website as being vague or ambiguous as a flag to the NLC disambiguation engine 120 that the statement is vague or ambiguous.

Having identified a statement in the corpus, e.g., the natural language content of the website, the NLC disambiguation engine 120 identifies the author or source of the statement and retrieves registered information about the author's private repository of information. The NLC disambiguation engine 120 may look to the user identifier associated with the particular post on the website, the authorship metadata associated with the portion of natural language content, the IP address of the source of the portion of natural language content, or any other designator of source or authorship associated with the natural language content to thereby identify the entity associated with the origination of the portion of natural language content. This information may then be correlated with registration information associated with either the system whose natural language content is being evaluated, e.g., the system hosting the website, or with the NLC disambiguation engine 120 itself, to retrieve registration information identifying the private repository of information associated with the source or author.

For example, the author may have a taxonomy of private information and, when registering with the website or source of natural language content upon which the NLC disambiguation engine 120 operates, or with the NLC disambiguation engine 120 itself, may designate portions of the taxonomy that are available for use by the NLC disambiguation engine 120 when attempting to disambiguate a portion of the natural language content. Thus, for example, the user may have a taxonomy that includes information about computer user interfaces and may designate that the NLC disambiguation engine 120 may utilize this information when disambiguating portions of natural language content. Similarly, the user may have a taxonomy that includes personal family information and may designate that this information cannot be used by the NLC disambiguation engine 120 or may otherwise not indicate this information as being available to the NLC disambiguation engine 120. In this way, from the taxonomy of information associated with the user, a sub-taxonomy of information that the NLC disambiguation engine 120 is permitted to utilize may be designated. This sub-taxonomy of information may be stored as part of the registration information associated with the source or author.

Once the NLC disambiguation engine 120 has identified a vague or ambiguous portion of content, e.g., statement, and identified that author or source of the vague or ambiguous portion of content, the authorized sub-taxonomy is identified which specifies which portions of the author or source's private information. The ambiguous or vague statement may then be matched, through lexical and/or semantic matching algorithms, to portions of the author or source's private information authorized for matching by the authorized sub-taxonomy. Once a match between the ambiguous or vague statement and a statement in the author or source's private information, the domain or subject matter context of the matched statement in the author or source's private information is determined and associated with the ambiguous or vague statement. It should be noted that the author or source's private information is not retrieved or otherwise made public and only the domain or subject matter context is extracted and associated with the ambiguous or vague statement. Thus, the privacy of the author or sources' private information is maintained.

Having identified the domain or subject matter context of the vague or ambiguous statement, the NLC disambiguation engine 120 then performs a search of publically available information in the corpus utilizing the key terms, key phrases, and the like, of the vague or ambiguous statement and the identified domain or subject matter context, to identify clarifying information in the corpus that may clarify the original vague or ambiguous statement. Mechanisms for scoring different portions of natural language content in the corpus (hereafter referred to as passages to thereby differentiate them from the portion of natural language content that is vague or ambiguous) based on a degree of matching with the key terms, key phrases, and domain/subject matter context, as well as analysis of other features or aspects of the natural language content, may be utilized to determine a best match of clarifying information, e.g., a highest scoring passage or portion of clarifying information.

Once the best match for clarifying information is identified by way of the domain or subject matter context bases search of the publically available information in the corpus, a clarifying operation is performed. The clarifying operation may be any suitable operation for the particular implementation, such as sending a question or suggestion message to the author or source of the vague or ambiguous statement requesting clarification or suggesting a way in which the original vague or ambiguous statement can be clarified. Other clarifying operations may include modifying the original vague or ambiguous statement to include the clarifying information, annotating or otherwise linking the clarifying information with the original vague or ambiguous statement without actually modifying the original vague or ambiguous statement. In some implementations, where the mechanisms of the illustrative embodiments are utilized during ingestion of a corpus by a cognitive system utilizing a question answering pipeline, as described hereafter, the clarifying operation may be to ingest the clarifying information along with the original vague or ambiguous statement such that annotations and features from the combination of the original vague or ambiguous statement and the clarifying information are ingested and used to generate data structures operated on by the annotators, scoring logic, and other mechanisms of the question answering pipeline. Any suitable clarifying operation that clarifies the original vague or ambiguous statement for use with the cognitive system may be performed without departing from the spirit and scope of the illustrative embodiments.

Thus, the mechanisms of the illustrative embodiments provide for the clarifying of vague or ambiguous portions of natural language content by utilizing private information of an author or source to identify the domain or subject matter context of the vague or ambiguous portions of natural language content without exposing the author or sources' private information. Having identified the domain or subject matter context, the publically available natural language content may be searched to identify clarifying information that may assist in clarifying the original vague or ambiguous natural language content.

To illustrate these mechanisms further, consider a scenario in which a first user, UserA, has private instant messaging chats with a chat group, GroupA, via a collaboration website and the instant messaging repository is accessible to the NLC disambiguation engine 120 for purpose of matching domains over which the users of the collaboration website have control. The user, UserA, may provide a sub-taxonomy that is allowed to be matched, e.g., "Allow all domains/words related to Computer User Interface." Thus, while the NLC disambiguation engine 120 may have access to UserA's private information comprising the content of the private instant messaging chats with GroupA users, the only "results" that the NLC disambiguation engine 120 may surface from a search of this private information is domains that are pre-allowed in the sub-taxonomy. In some cases, for example, the collaboration website may be configured as a taxonomy of forums in which users post messages and the sub-taxonomy may be specified as a subset of the forums. It should be appreciated that the user may continuously or periodically add and remove domains/subject matter contexts to their pre-allowed sub-taxonomy and the NLC disambiguation engine 120 or the collaboration website may perform ad-hoc or real-time messaging with the user or source of private information to request updates to the pre-allowed sub-taxonomy.

Assume that UserA posts a message to the website that states "the new 9.0.3 release is really good to use." Another user, UserB, may mark this posted message as vague or ambiguous, e.g., by selecting an "unsure" user interface component associated with the message, since UserB may not have access to the private information of UserA, i.e. UserA's private messaging with GroupA, which provides the context of the vague or ambiguous message. This identifies to the NLC disambiguation engine 120 that the posted message is vague or ambiguous to UserB. As a result, the NLC disambiguation engine 120 operates to attempt to clarify the ambiguous or vague message by identifying the source or author of the message, e.g., UserA, and retrieve registered information associated with UserA including the pre-allowed sub-taxonomy associated with UserA.

The private instant messaging chats as a whole, or only those associated with the sub-taxonomy that is pre-allowed, associated with the source of the vague or ambiguous message, i.e. UserA, may be searched to identify matching terms/phrases present in these private instant messaging chats. Domains or subject matter contexts of matching private instant messaging chats may be determined based on a natural language semantic and/or lexical analysis of the matching private instant messaging chats. For example, the private messages posted by UserA to the GroupA chat sessions may be searched and it may be determined that there is a 82% statistical match of the term "Lotus Notes" with the term "9.0.3 release" in the vague or ambiguous message. Moreover, it may be determined that "Lotus Notes" is associated with the pre-allowed domain or subject matter context "e-mail messaging system" in the sub-taxonomy.

As a result, a search of the publically available corpus of information, e.g., the other non-private group chats, a separate corpus of information, or the like, is performed based on the features extracted from the original ambiguous or vague message and the identified domain or subject matter context. For example, a search of "9.0.3 release" and "email" or "messaging" and "system" may be performed and a highest statistical match may be selected. For example, a comparison of matching texts in the corpus of information may identify portions of text such as " . . . installation of Lotus Notes 9.0.3 . . . ", "UserC: Lotus Notes 9.0.3 is available . . . ", "Lotus Notes 9.0.3 has widgets . . . ", and " . . . the feed functionality in Lotus Notes 9.0.3 . . . " that have high matches with the search key words, key phrases, and the domain or subject matter context. This would return a result of "Lotus Notes" as the weighting on the proximate subject to 9.0.3, e.g., "there is a 91% statistical match to Lotus Notes 9.0.3".

Having identified the most probable clarifying information for clarifying the original vague or ambiguous message, a clarifying operation is performed. In one embodiment, this clarifying operation may be to send a clarifying question to the author or source of the original ambiguous or vague message, e.g., UserA. For example, a question may be sent to UserA of the type "Are you referring to Lotus Notes 9.0.3?" and UserA may respond accordingly. If UserA responds in the affirmative, then the original ambiguous or vague message may be automatically modified to clarify the message by referring to "Lotus Notes" 9.0.3, i.e. "the new Lotus Notes 9.0.3 release is really good to use." Alternatively, a message may be sent to the author recommending or suggesting that the original vague or ambiguous message be modified to refer to Lotus Notes 9.0.3 but leaving it to the author or source to make the modification. In still another alternative embodiment, the original vague or ambiguous message may be annotated to reference "Lotus Notes" or the message may be ingested along with the clarifying information for "Lotus Notes."

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and request pipeline 108, augmented to include the additional mechanisms of the illustrative embodiments described herein with regard to the natural language content disambiguation engine.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In some illustrative embodiments, memory 208, ROM 224, or the like, may comprise instructions, such as may be provided in firmware, loaded from a medium read by a peripheral device, such as a HDD 226 or CD-ROM drive 230, for example, so that the processing unit 206 of the data processing system 200 may execute the instructions to implement a natural language content disambiguation engine, such as NLC disambiguation engine 120 in FIG. 1, for example. As such, the data processing system may be specifically configured to be a specialized machine that operates to perform the various functions attributed to the NLC disambiguation engine 120 discussed herein. The data processing system 200 may further implement the cognitive system and request pipeline mentioned above or may operate in conjunction with a separate data processing system that implements such a cognitive system and/or request pipeline. It should be appreciated that the data processing system 200 may be implemented as, or as part of, a cloud computing system as will be described in greater detail hereafter.

As noted above, in some example embodiments, the mechanisms of the illustrative embodiments may be utilized to augment the operation of a cognitive system where the request pipeline is a question answering (QA) system pipeline that provides a question answering functionality. FIG. 3 illustrates a QA system pipeline, of a cognitive system, for processing an input question in accordance with one illustrative embodiment. The QA system pipeline of FIG. 3 may be implemented, for example, as request pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, and ingestion engine 390 is utilized to ingest and process the corpora 347 for use by the QA system pipeline 300. The ingestion engine 390 may perform ingestion operations known in the art but which are augmented to identify ambiguous or vague portions of natural language content and then operate on these identified ambiguous or vague portions of natural language content to disambiguate them using the domain/subject matter context discerned from private information associated with the source or author of the ambiguous or vague portions of the natural language content. This functionality is provided via the natural language content (NLC) disambiguation engine 392 that is implemented as part of the ingestion engine 390 logic. The NLC disambiguation engine 392 comprises a controller 393, vague/ambiguous content logic 394, source private information registration logic 395 which interfaces with source registry 396, private information analysis logic 397, clarifying information search logic 398, and clarifying operation logic 399.

The controller 393 of the NLC disambiguation engine 392 operates to control the operation of the NLC disambiguation engine 392 and orchestrate the operation of the other elements 393-399. Any operations of the NLC disambiguation engine 392 not specifically attributed to one of the other elements 394-399 is performed by the controller 393. The vague/ambiguous content logic 394 operates to analyze the natural language content as it is ingested from the corpus 347 to determine if the natural language content contains portions that are determined to be vague or ambiguous. As noted above, this may be done by evaluating manually set flags, such as an "unsure" flag, performing automated pattern matching with patterns indicative of a vague or ambiguous natural language content, or the like.

The source private information registration logic 395 performs the various operations described herein for registering sources and authors of natural language content or interfacing with systems that perform such registering, such that information about the source or author may be retrieved. In one illustrative embodiment, the source private information registration logic 395 may operate to provide interfaces through which users of a website may register their own personal information, including user identifiers which can be matched to their contributions to the website, and to specify which elements of a taxonomy may be made available to the NLC disambiguation engine 392 for use in disambiguating natural language content. This information may be stored in the source registry 396 and may be accessible via the source private information registration logic 395.

The private information analysis logic 397 provides the functionality for analyzing private information associated with a source or author of a portion of natural language content to determine a domain or subject matter context for an identified vague or ambiguous portion of natural language content. The clarifying information search logic 398 provides the functionality for performing a search of publically available information, such as may be provided in the corpora 347, to identify clarifying information matching the key features of the original vague or ambiguous portion of natural language content and the identified domain/subject matter context. The clarifying operation logic 399 operates to perform a clarifying operation based on the results generated by the clarifying information search logic 398, such as modifying or annotating the original vague or ambiguous portion of natural language content, asking clarifying questions or providing clarifying suggestions to the source/author, or the like.

It should be appreciated that in this depicted embodiment, the resulting clarified natural language content may be stored in data structures of the corpora 347, stored in an in-memory representation of ingested corpora 347 of the QA system pipeline 300 upon which the operations of the QA system pipeline 300 may be performed so as to answer input questions 310, or the like. In general, the clarified natural language content is made available to the QA system pipeline 300 for use in performing its operations. It should be appreciated that similar mechanisms may be provided for other types of cognitive systems including cognitive search engines such that the clarified natural language content is provided to the cognitive search engine for use in performing searches in response to search requests.

Figure 4:
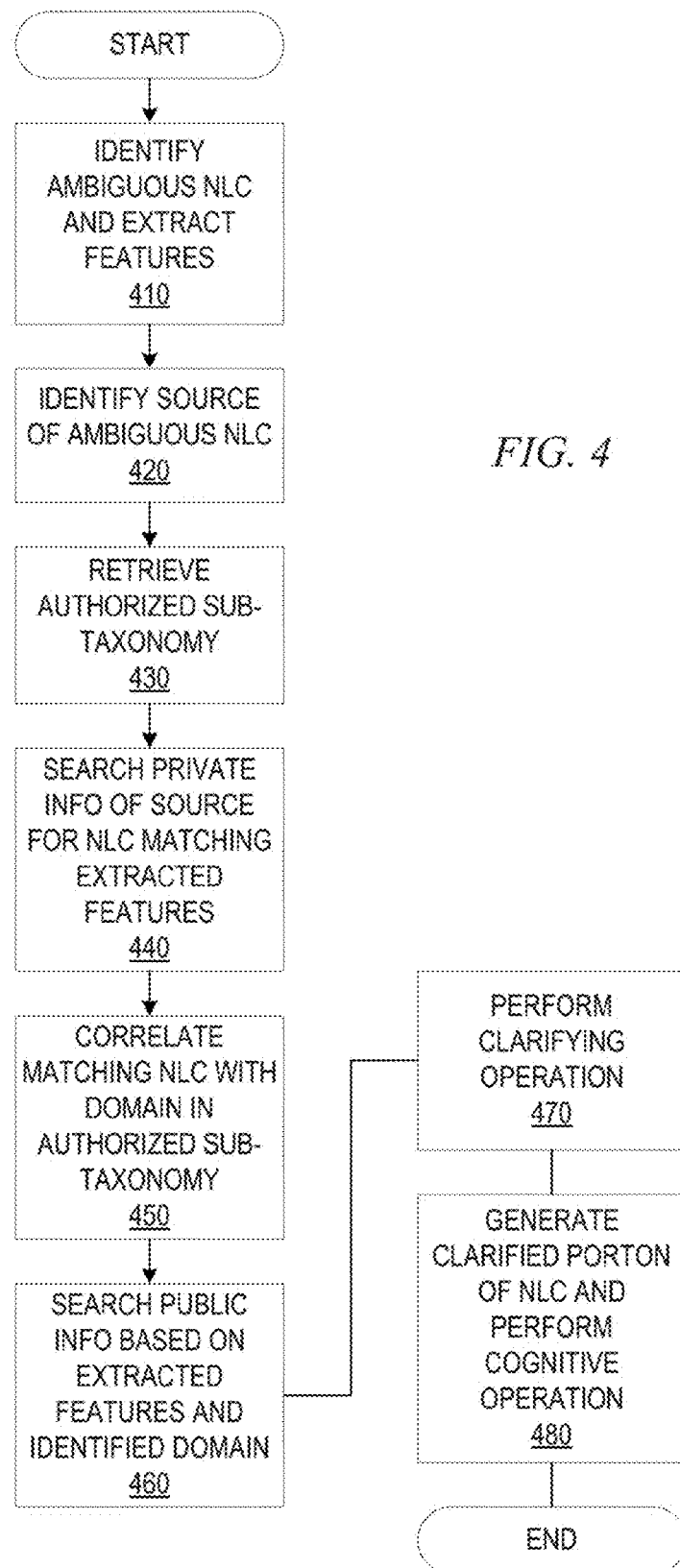
FIG. 4 is a flowchart outlining an example operation for performing natural language content disambiguation in accordance with one illustrative embodiment.

FIG. 4 is a flowchart outlining an example operation for performing a clarification of a vague or ambiguous portion of natural language content in accordance with one illustrative embodiment. As shown in FIG. 4, the operation starts by identifying a vague or ambiguous portion of natural language content and extracted features of the portion of natural language content, e.g., key words, key phrases, and the like (step 410). As noted above, this identification can be performed in many different ways including a manual flagging of vague or ambiguous content, an automated pattern matching operation, or the like. Once the vague or ambiguous portion of content is identified and features are extracted, the illustrative embodiments identify a source or author of the vague or ambiguous portion of content (step 420). This can be done in many different ways and in one illustrative embodiment is done by performing a lookup operation in one or more source/author registries based on a user identifier associated with the portion of content determined to be vague or ambiguous.

The authorized sub-taxonomy information for the identified source or author is retrieved (step 430) and the private information for the source/author is searched for corresponding matching natural language content matching the extracted features from the identified vague or ambiguous portion of natural language content (step 440). The matching natural language content is correlated to a domain/subject matter context in the authorized sub-taxonomy (step 450). The corresponding domain/subject matter context is used along with the features extracted from the original vague or ambiguous portion of natural language content to perform a search of publically available information to finding matching clarification information in the publically available information that can provide clarification to the original vague or ambiguous portion of natural language content (step 460).

The identified clarification information is used to perform a clarification operation (step 470). The clarification operation may comprise automatically modifying the original vague or ambiguous natural language content so that it is no longer vague or ambiguous, annotating the original vague or ambiguous natural language content, sending a clarification recommendation message or a clarifying question to the source/author, or the like. In response to the clarification operation being performed, a clarified portion of natural language content may be generated and provided as an input to a cognitive system for use in performing a cognitive operation (step 480). The cognitive operation may comprise a cognitive search, a natural language processing operation, such as a question answering operation, or the like. The operation then terminates.

Thus, the illustrative embodiments provide mechanisms for identifying vague or ambiguous natural language content and performing operations to clarify the identified vague or ambiguous natural language content. These operations involve leveraging private information associated with the source or author of the original vague or ambiguous natural language content to assist in understanding the domain or subject matter context of the original vague or ambiguous natural language content without exposing the private information associated with the source or author. The identified domain or subject matter context may then be used to search for and utilize clarifying information found in publically available information. Clarified natural language content may then be generated, either by modifying the content, annotating the content, or performing another clarifying operation to clarify the original vague or ambiguous natural language content. The clarified natural language content may then be input to a cognitive system for use in performing a cognitive operation.

As touched upon above, in some illustrative embodiments, the data processing system in which the mechanisms of the illustrative embodiments may be implemented may comprise a cloud computing system. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics of a cloud model are as follows:

(1) On-demand self-service: a cloud consumer can unilaterally provision computing capabilities, such as server time and network storage, as needed automatically without requiring human interaction with the service's provider.

(2) Broad network access: capabilities are available over a network and accessed through standard mechanisms that promote use by heterogeneous thin or thick client platforms (e.g., mobile phones, laptops, and PDAs).

(3) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

(4) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

(5) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models are as follows:

(1) Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(2) Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(3) Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models are as follows:

(1) Private cloud: the cloud infrastructure is operated solely for an organization. It may be managed by the organization or a third party and may exist on-premises or off-premises.

(2) Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

(3) Public cloud: the cloud infrastructure is made available to the general public or a large industry group and is owned by an organization selling cloud services.

(4) Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
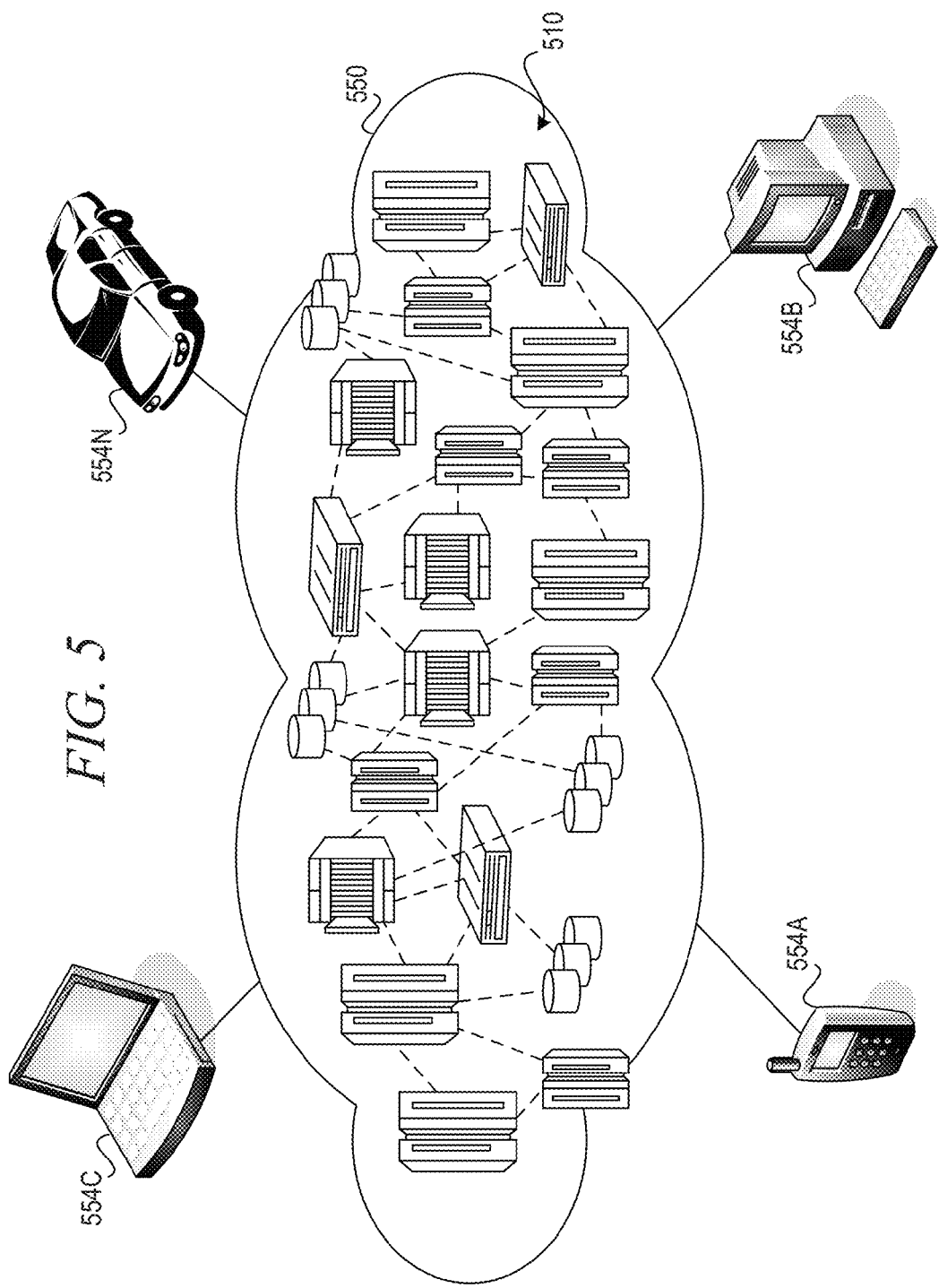
FIG. 5 is an example diagram of a depiction of a cloud computing environment according to one illustrative embodiment.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
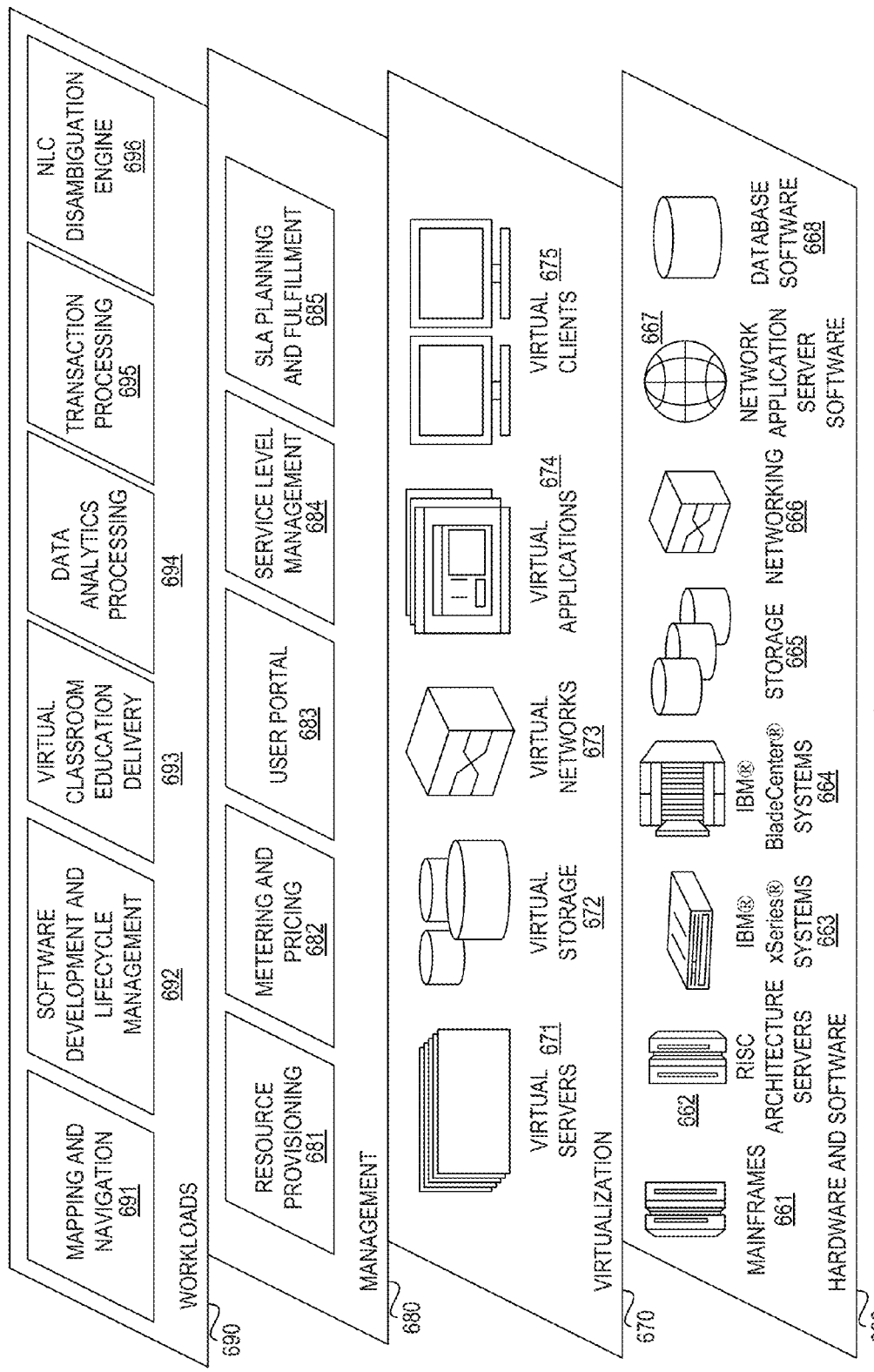
FIG. 6 is an example diagram illustrating abstraction model layers according to one illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and natural language content (NLC) disambiguation engine 696. The NLC disambiguation engine 696 operates in the manner previously discussed above with regard to one or more of the illustrative embodiments described herein.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to configure the data processing system to implement a natural language content (NLC) disambiguation engine, the method comprising:
   identifying, by the NLC disambiguation engine, in a corpus of natural language content, a portion of natural language content (NLC) that is determined to be ambiguous with regard to a context of the portion of NLC, thereby identifying an ambiguous content portion;
   comparing, by the NLC disambiguation engine, the ambiguous content portion to private content information associated with a source of the ambiguous content portion, wherein the private content information is content information accessible to users and resources associated with the source and is not accessible to users or resources that are not associated with the source;
   identifying, by the NLC disambiguation engine, a domain of the ambiguous content portion based on a domain of a matching portion of the private content information; and
   performing, by the NLC disambiguation engine, a clarifying operation that clarifies the ambiguous content portion based on the identified domain of the ambiguous content portion to thereby generate a clarified content portion for processing by a cognitive operation of a cognitive system.

2. The method of claim 1, wherein identifying the ambiguous content portion comprises determining that the portion of NLC is associated with a flag indicating that at least one user considers the portion of NLC to be ambiguous.

3. The method of claim 1, wherein identifying the ambiguous content portion comprises comparing the natural language content in the corpus of natural language content to one or more patterns of natural language content corresponding to ambiguous content, and identifying the portion of natural language content to be the ambiguous content portion in response to the portion of natural language content matching at least one of the one or more patterns of natural language content.

4. The method of claim 1, wherein comparing the ambiguous content portion to private content information comprises:
   comparing one or more extracted first features of the ambiguous content portion to one or more second features of the private content information; and
   identifying a matching portion of the private content information based on a degree of correspondence between the one or more extracted first features and the one or more second features, wherein the portion of the private content information comprises a portion having a second feature matching a first feature.

5. The method of claim 1, wherein the clarifying operation comprises at least one of sending a clarifying question to the source, wherein the clarifying question specifies the identified domain of the ambiguous content portion or sending a notification to the source indicating a need to clarify the ambiguous content portion and specifying the identified domain of the ambiguous content portion.

6. The method of claim 1, wherein the domain of the matching portion of the private content information comprises a domain, in a taxonomy data structure specifying domains corresponding to private content information associated with the source, which is indicated by the source to be able to be used by the NLC disambiguation engine to disambiguate ambiguous content.

7. The method of claim 6, wherein the identified domain of the ambiguous content portion is part of a sub-portion of the taxonomy data structure that is registered by the source with the NLC disambiguation engine as being able to be used by the NLC disambiguation engine to disambiguate ambiguous content, and wherein other portions of the taxonomy data structure are not able to be used by the NLC disambiguation engine to disambiguate ambiguous content.

8. The method of claim 1, wherein the private content information is not exposed to users or resources that are not associated with the source or authorized access by the source when performing the method.

9. The method of claim 1, wherein the portion of NLC comprises a portion of natural language content of a corpus of natural language content ingested into a cognitive system, and wherein the cognitive operation is one of a cognitive search operation for searching for matching natural language content to a search request submitted to the cognitive system or a cognitive question answering operation for generating a natural language answer to a input natural language question.

10. The method of claim 1, wherein the portion of NLC comprises a message posted to a collaborative website by a user that is the source, and wherein the private content information comprises a set of messages posted to the collaborative website by users that are part of a private group of the collaborative website.

11. A computer program product comprising a computer readable storage medium having a computer readable program stored therein, wherein the computer readable program, when executed on a computing device, causes the computing device to implement a natural language content (NLC) disambiguation engine, that operates to:
   identify, in a corpus of natural language content, a portion of natural language content (NLC) that is determined to be ambiguous with regard to a context of the portion of NLC, thereby identifying an ambiguous content portion;

compare the ambiguous content portion to private content information associated with a source of the ambiguous content portion, wherein the private content information is content information accessible to users and resources associated with the source and is not accessible to users or resources that are not associated with the source;

identify a domain of the ambiguous content portion based on a domain of a matching portion of the private content information; and perform a clarifying operation that clarifies the ambiguous content portion based on the identified domain of the ambiguous content portion to thereby generate a clarified content portion for processing by a cognitive operation of a cognitive system.

12. The computer program product of claim 11, wherein the NLC disambiguation engine identifying the ambiguous content portion comprises determining that the portion of NLC is associated with a flag indicating that at least one user considers the portion of NLC to be ambiguous.

13. The computer program product of claim 11, wherein the NLC disambiguation engine identifying the ambiguous content portion comprises comparing the natural language content in the corpus of natural language content to one or more patterns of natural language content corresponding to ambiguous content, and identifying the portion of natural language content to be the ambiguous content portion in response to the portion of natural language content matching at least one of the one or more patterns of natural language content.

14. The computer program product of claim 11, wherein the NLC disambiguation engine comparing the ambiguous content portion to private content information comprises:

comparing one or more extracted first features of the ambiguous content portion to one or more second features of the private content information; and identifying a matching portion of the private content information based on a degree of correspondence between the one or more extracted first features and the one or more second features, wherein the portion of the private content information comprises a portion having a second feature matching a first feature.

15. The computer program product of claim 11, wherein the clarifying operation comprises at least one of sending a clarifying question to the source, wherein the clarifying question specifies the identified domain of the ambiguous content portion or sending a notification to the source indicating a need to clarify the ambiguous content portion and specifying the identified domain of the ambiguous content portion.

16. The computer program product of claim 11, wherein the domain of the matching portion of the private content information comprises a domain, in a taxonomy data structure specifying domains corresponding to private content information associated with the source, which is indicated by the source to be able to be used by the NLC disambiguation engine to disambiguate ambiguous content.

17. The computer program product of claim 16, wherein the identified domain of the ambiguous content portion is part of a sub-portion of the taxonomy data structure that is registered by the source with the NLC disambiguation engine as being able to be used by the NLC disambiguation engine to disambiguate ambiguous content, and wherein other portions of the taxonomy data structure are not able to be used by the NLC disambiguation engine to disambiguate ambiguous content.

18. The computer program product of claim 11, wherein the private content information is not exposed to users or resources that are not associated with the source or authorized access by the source when performing the method.

19. The computer program product of claim 11, wherein the portion of NLC comprises a portion of natural language content of a corpus of natural language content ingested into a cognitive system, and wherein the cognitive operation is one of a cognitive search operation for searching for matching natural language content to a search request submitted to the cognitive system or a cognitive question answering operation for generating a natural language answer to a input natural language question.

20. The computer program product of claim 11, wherein the portion of NLC comprises a message posted to a collaborative website by a user that is the source, and wherein the private content information comprises a set of messages posted to the collaborative website by users that are part of a private group of the collaborative website.

21. An apparatus comprising:

a processor; and a memory coupled to the processor, wherein the memory comprises instructions which, when executed by the processor, cause the processor to:

identify, in a corpus of natural language content, a portion of natural language content (NLC) that is determined to be ambiguous with regard to a context of the portion of NLC, thereby identifying an ambiguous content portion;

compare the ambiguous content portion to private content information associated with a source of the ambiguous content portion, wherein the private content information is content information accessible to users and resources associated with the source and is not accessible to users or resources that are not associated with the source;

identify a domain of the ambiguous content portion based on a domain of a matching portion of the private content information; and perform a clarifying operation that clarifies the ambiguous content portion based on the identified domain of the ambiguous content portion to thereby generate a clarified content portion for processing by a cognitive operation of a cognitive system.

* * * * *